(12) United States Patent
Busch et al.

(10) Patent No.: US 7,893,128 B2
(45) Date of Patent: Feb. 22, 2011

(54) CATIONIC RADIATION-CURING CONTROLLED RELEASE COATING MATERIALS

(75) Inventors: Stefan Busch, Bochum (DE); Hardi Doehler, Duesseldorf (DE); Michael Ferenz, Essen (DE); Sascha Herrwerth, Essen (DE)

(73) Assignee: Evonik Glodschmidt GmbH (DE)

( * ) Notice: Subject to any disclaimer, the term of this patent is extended or adjusted under 35 U.S.C. 154(b) by 408 days.

(21) Appl. No.: 11/747,556

(22) Filed: May 11, 2007

(65) Prior Publication Data

US 2007/0287765 A1    Dec. 13, 2007

(30) Foreign Application Priority Data

Jun. 13, 2006    (DE) ........................ 10 2006 027 339

(51) Int. Cl.
C08G 77/04 (2006.01)
C08G 77/38 (2006.01)
C09D 183/06 (2006.01)
C08L 83/06 (2006.01)

(52) U.S. Cl. .......................... 522/148; 528/25; 528/27; 528/33

(58) Field of Classification Search ............... 522/31, 522/66, 148; 528/25, 27, 33
See application file for complete search history.

(56) References Cited

U.S. PATENT DOCUMENTS

| 4,201,808 A | 5/1980 | Cully et al. |
| 4,279,717 A | 7/1981 | Eckberg et al. |
| 4,421,904 A | 12/1983 | Eckberg et al. |
| 4,547,431 A | 10/1985 | Eckberg |
| 4,568,566 A | 2/1986 | Tolentino |
| 4,678,846 A | 7/1987 | Weitemeyer et al. |
| 4,952,657 A | 8/1990 | Riding et al. |
| 5,057,549 A | 10/1991 | Herzig et al. |
| 5,158,991 A | 10/1992 | Riding |
| 5,217,805 A | 6/1993 | Kessel et al. |
| 5,231,157 A | 7/1993 | Herzig et al. |
| 5,279,860 A | 1/1994 | Griswold et al. |
| 5,340,898 A | 8/1994 | Cavezzan et al. |
| 5,360,833 A | 11/1994 | Eckberg et al. |
| 5,369,205 A | 11/1994 | Eckberg et al. |
| 5,468,890 A | 11/1995 | Herzig et al. |
| 5,494,979 A | 2/1996 | Ebbrecht et al. |
| 5,510,190 A | 4/1996 | Allen et al. |
| 5,804,301 A | 9/1998 | Curatolo |
| 5,866,261 A | 2/1999 | Kerr, III et al. |
| 5,973,020 A | 10/1999 | Kerr, III et al. |
| 5,977,282 A | 11/1999 | Ebbrecht et al. |
| 6,069,259 A * | 5/2000 | Crivello ...................... 549/214 |
| 6,828,404 B2 * | 12/2004 | Crivello ...................... 528/25 |

FOREIGN PATENT DOCUMENTS

| EP | 0 334 056 A2 | 9/1989 |
| EP | 0355381 A | 2/1990 |
| EP | 0599615 A | 6/1994 |
| EP | 1 101 727 A1 | 5/2001 |
| GB | 2 152 946 | 8/1985 |

* cited by examiner

*Primary Examiner*—Susan W Berman
(74) *Attorney, Agent, or Firm*—Frommer Lawrence & Haug LLP

(57) ABSTRACT

The invention provides radiation-curing coating materials composed of at least one silicone resin modified with vinylalkoxysilane and vinylcyclohexene oxide and of at least one epoxy-functionalized polysiloxane and of a cationic photoinitiator. Furthermore, coinitiators may also be a constituent of the mixture, in order to obtain increased reactivity of the formulation.

5 Claims, No Drawings

CATIONIC RADIATION-CURING CONTROLLED RELEASE COATING MATERIALS

The present invention relates to radiation-curing coating materials composed of at least one silicone resin modified with vinylalkoxysilane and vinylcyclohexene oxide and of at least one epoxy-functionalized polysiloxane and of a cationic photoinitiator. Furthermore, coinitiators may also be a constituent of the mixture, in order to obtain increased reactivity of the formulation.

PRIOR ART

Abhesive coating materials are used extensively for the coating in particular of sheetlike materials in order to reduce the propensity of adherent products to adhere to these surfaces. Sheetlike materials coated in this way are frequently termed release films or release papers.

Abhesive coating materials are used for example to coat papers or films which are intended as backings for self-adhesive labels.

The labels, provided with a pressure-sensitive adhesive, still adhere to the coated surface to a sufficient extent to allow the backing films bearing the adhesive labels to be handled. The different pressure-sensitive adhesives require release coatings set to different degrees of abhesion.

Further possibilities for the use of abhesive coating materials are packaging papers which are used in particular for the packaging of sticky products. Release coatings of this kind are used, for example, to package foodstuffs or to package industrial products, such as bitumen. The different sticky products require coatings set to different degrees of abhesion.

A further application of abhesive coating materials is in the production of self-stick closures, as, for example, for disposable diapers, or of adhesive tapes. These applications too use release coatings set to different degrees of abhesion.

In all cases, the stability of the abhesiveness over long periods of time is important for the function of abhesive coatings. There must be no significant increase nor decrease in the release value.

Since the 1980's there have been two radiation-curing abhesive coating materials known in the market.

One system cures by a free-radical mechanism following irradiation with UV rays or electron beams.

Systems of this kind are described for example in U.S. Pat. No. 4,201,808, U.S. Pat. No. 4,568,566, U.S. Pat. No. 4,678,846, U.S. Pat. No. 5,494,979, U.S. Pat. No. 5,510,190, U.S. Pat. No. 5,804,301 and U.S. Pat. No. 5,977,282, and are available commercially, for example, under the name Tego RC 902, Tego RC 711 or Tego RC 715.

The other system cures by a cationic curing mechanism. These systems are composed of organopolysiloxanes which contain reactive groups and cure under UV radiation. These reactive groups may be epoxy groups, vinyl ether groups or vinyloxy groups. Substances of this kind are described for example in U.S. Pat. No. 5,057,549, U.S. Pat. No. 5,231,157, U.S. Pat. No. 4,421,904, U.S. Pat. No. 4,547,431, U.S. Pat. No. 4,952,657, U.S. Pat. No. 5,217,805, U.S. Pat. No. 5,279,860, U.S. Pat. No. 5,340,898, U.S. Pat. No. 5,360,833, U.S. Pat. No. 5,650,453, U.S. Pat. No. 5,866,261 and U.S. Pat. No. 5,973,020. In systems of this kind the polymerizable groups are typically epoxy groups.

Commercially, products of this kind are available, for example, under the name GE UV 9300, GE UV 9400, Tego® RC 1411, Tego® RC 1402 or Tego® RC 1400.

Cationic photopolymerization is a rapid, efficient, and eco-friendly way to cure cationic polymerizable monomers. Particularly efficient photoinitiators are diaryliodonium salts (I) and triarylsulfonium salts (II)

in which

Ar stands for identical or different aromatic radicals which if desired may contain heteroatoms and/or further substituent radicals.

Diaryliodonium salts (I) in particular are known from the patent literature (GB-A-1 516 352, U.S. Pat. No. 4,279,717, EP-A-0 334 056, U.S. Pat. No. 5,468,890) and are used as photoinitiators for polymerizing cationic polymerizable substances. The photoinitiator or cationic curing coating material may have coinitiators added to it that accelerate the cure. Additives of this kind may be free-radical photoinitiators, reactive monomers or UV sensitizers. UV sensitizers are known for example from the group of the benzophenones, thioxanthones and anthracenes. Coinitiators which are soluble in the cationic curing coating material, in particular, are especially effective in this context.

The controlled setting of release values is an important requirement associated with the use of cationic radiation-curing coating materials. A distinction is made in coatings between those having a low, a moderate, and a high release value. The height of the release values is also dependent on the substrate used and on the adhesive employed, with the consequence that the numerical values can only be stated as being characteristic of the particular technical conditions. The skilled worker differentiates between easy, controlled, and tight release.

For a variety of applications an increased release value (controlled release) is desirable: for example, in order to prevent premature parting of the labels from the substrate. Consequently, those systems that are available commercially are required to allow the setting of a broad spectrum of release values.

The literature describes a variety of controlled release additives for cationic radiation-curing release coatings that allow a controlled increase to be brought about in the release values.

U.S. Pat. No. 4,547,431 describes controlled release formulations which are composed of epoxy-functional linear polysiloxanes, cationic photoinitiators, and organic polyepoxides. By means of the amount of organic polyepoxides it is possible to adjust the release values. The greater the extent to which organic polyepoxides are used, the higher the release values that can be achieved.

U.S. Pat. No. 4,952,657 discloses controlled release formulations which are composed of phenol derivatives and of vinylcyclohexene monooxide-modified linear polysiloxanes, epoxy-modified polysiloxanes, and cationic photoinitiators. The release values can be adjusted through the proportion of phenol derivatives and vinylcyclohexene monooxide-modified polysiloxane chains. For many applications, however, the release values achieved are inadequate. Moreover, these systems do not cure quickly enough, and so are not used in industrial operations.

U.S. Pat. No. 5,360,833 and U.S. Pat. No. 5,158,991 describe controlled release formulations which are composed of vinylcyclohexene monooxide-modified linear polysiloxanes, cationic photoinitiators, and vinylcyclohexene monooxide-modified M/Q resins. Via the amount of vinylcyclohexene monooxide-modified silicone resin used it is possible to adjust the release values. However, formulations of this kind have the drawback that sufficiently high release values cannot be attained. Moreover, the release behavior toward numerous adhesives is not constant. Instead, in the course of release, there is a rapid switch between high and low release forces, leading on average to a reduced value. This unwanted process is known to the skilled worker as zip. With these formulations, moreover, there are sharp fluctuations in release values from one production to the next, thereby greatly restricting their industrial use.

U.S. Pat. No. 5,369,205 discloses controlled release additives which can be obtained by hydrosilylating vinyl-functional M/Q silicone resins with linear SiH siloxanes and then carrying out reaction with vinylcyclohexene monooxide. The resulting additives are used in formulations with vinylcyclohexene monooxide-modified linear polysiloxanes and cationic photoinitiators. Such formulations, however, have the drawbacks that sufficiently high release values cannot be achieved and that zip occurs in the case of a large number of adhesives. Furthermore, with these formulations, there are large fluctuations in the release values, thereby severely restricting their industrial use.

U.S. Pat. No. 5,866,261 describes controlled release formulations which are composed of vinylcyclohexene monooxide-modified linear polysiloxanes, cationic photoinitiators, and SiH-functional silicone M/Q resins. Via the amount of SiH-functional silicone resin used it is possible to adjust the release values. Such formulations as well, however, have the drawbacks that sufficiently high release values cannot be achieved and that zip occurs in the case of a large number of adhesives. Furthermore, with these formulations, there are large fluctuations in the release values, thereby severely restricting their industrial use.

A further drawback of the prior-art systems is that, owing to an inadequate degree of crosslinking, the cured coatings still comprise extractable constituents.

It was an object of this invention to find a controlled release formulation and a controlled release additive which do not have the drawbacks of the prior art.

Surprisingly, this object is achieved through the use of new silicone resins which are modified not only with vinylcyclohexene oxide but also with vinylalkoxysilanes.

The invention accordingly provides a cationic radiation-curing controlled release formulation for producing silicone release coatings, composed of:
a) 1% to 60% by mass of at least one silicone resin modified with vinylalkoxysilane and vinylcyclohexene oxide,
b) 35% to 98.5% by mass of at least one epoxy-functionalized polysiloxane, and
c) 0.5% to 5% by mass of at least one cationic photoinitiator.

Furthermore, coinitiators may also be a constituent of the mixture, in order to achieve increased reactivity of the formulation.

The modified silicone resins as per a) are preparable by at least partial reaction of A) SiH-functional silicone resins of the general formula (I), $$M_aM'_bD_cD'_dT_eQ_f \quad (I)$$

in which
$M=(R^1)_3SiO_{1/2}$,
$M'=(R^1)_2HSiO_{1/2}$,
$D=(R^1)_2SiO_{2/2}$,
$D'=(R^1)HSiO_{2/2}$,
$T=(R^1)SiO_{3/2}$,
$Q=SiO_{4/2}$,
$R^1$ are identical or different radicals from the following group: alkyl, aryl, or alkaryl having 1 to 30 C atoms,
a=4 to 200,
b=0 to 20,
c=0 to 100,
d=0 to 20,
e=0 to 150, and
f=1 to 200,
with the proviso that the sum of b+d is $\geq 1$, with B) vinylalkoxysilanes of the general formula (II),

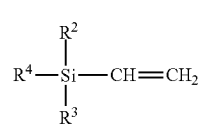

formula (II)

in which
$R^2$, $R^3$, and $R^4$ are identical or different alkyl, alkoxy, aryl, aryloxy or alkenyl radicals having 1 to 20 carbon atoms, preferably methoxy or ethoxy groups, with the proviso that at least one radical is an alkoxy group, and vinylcyclohexene oxide
with the proviso that the molar ratio n(vinylalkoxysilane)/n(vinylcyclohexene oxide) is >1.

If desired, in the reaction of the SiH-functional silicone resins with the vinylalkoxysilanes and olefinic epoxides, it is also possible to use other olefinic compounds as well.

Particularly preferred vinylalkoxysilanes are vinyltrialkoxy-silanes (e.g., vinyltrimethoxysilane or vinyltriethoxysilane).

Component b) is an epoxy-functionalized polysiloxane, in accordance with the prior art. They have been known on the market as radiation-curing, siloxane-containing coating materials since the nineteen-eighties and are described in patents including U.S. Pat. No. 4,421,904, U.S. Pat. No. 4,547,431, U.S. Pat. No. 4,952,657, U.S. Pat. No. 5,217,805, U.S. Pat. No. 5,279,860, U.S. Pat. No. 5,340,898, U.S. Pat. No. 5,360,833, U.S. Pat. No. 5,650,453, U.S. Pat. No. 5,866,261, EP-1 101 727 and U.S. Pat. No. 5,973,020. The epoxy-functionalized polysiloxanes cited in these patents may be used in accordance with the invention.

The content of the above-recited literature and patent literature on the chemical characterization of the siloxane-containing coating materials containing reactive groups and also on the catalysts and initiators that can be used as well is therefore hereby incorporated as a reference and is considered part of the disclosure content of the present specification.

The formulations of the invention exhibit particularly positive controlled release effects when the components used include epoxy-functional polysiloxanes as per claim 1, component b), which as well as the epoxy groups also carry, partially, hydroxyl groups, in accordance with the general formula (IV)

formula (IV)

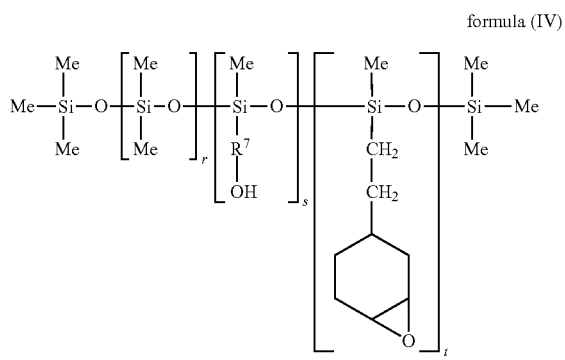

in which

R⁷ are identical or different alkenyl groups having 2 to 20 carbon atoms, and may contain ether, ester, urethane or amide groups, r is 5 to 300, preferably 5 to 200, s is 0.1 to 100, preferably 0.1 to 10, and t is 1 to 100, preferably 2 to 40.

Compounds of this kind are available commercially, for example, under the name Tego® RC 1402.

Suitable, particularly efficient photoinitiators are diaryliodonium salts (I) and triarylsulfonium salts (II)

$X^- = BF_4^-, PF_6^-, AsF_6^-, SbF_6^-$ in which

Ar stands for identical or different aromatic radicals which if desired may contain heteroatoms and/or further substituent radicals.

Diaryliodonium salts (I) in particular are known from the patent literature (GB-A-1 516 352, U.S. Pat. No. 4,279,717, EP-A-0 334 056, U.S. Pat. No. 5,468,890) and are used as photoinitiators for polymerizing cationic polymerizable substances.

The photoinitiator or cationic curing coating material may have coinitiators added to it that accelerate the cure. Additives of this kind may be free-radical photoinitiators, reactive monomers or UV sensitizers. UV sensitizers are known for example from the group of the benzophenones, thioxanthones, and anthracenes. Coinitiators which are soluble in the cationic curing coating material, in particular, are especially effective in this context.

A further possibility when using release additives of the invention is to compound the cationic radiation-curing epoxy-functionalized siloxanes additionally with other additives such as, for example, fillers or pigments.

EXAMPLES

The examples which follow are intended to illustrate the invention; they do not constitute any restriction whatsoever.

The skilled worker is familiar with the fact that the stated formulae represent idealized structural formulae.

Example 1 (Inventive)

Preparation of a controlled release additive having pendent and terminal functionalities and subsequent redissolution in an epoxy-functionalized siloxane:

1a) Equilibration of an SiH-functional polysiloxane with M, M', D, D' and Q groups:

A 1000 mL three-neck flask was charged with 170 g of an α,ω-SiH-siloxane (M'-D₈-M', SiH value: 0.3%), 11 g of a pendent SiH siloxane (M-D'₄₈-M, SiH value: 1.6%) and 642 g of a commercially customary M/Q silicone resin solution in xylene (solids content approximately 61%, Mw approximately 2300 g/mol). An acidic catalyst was added with stirring and the mixture was stirred for 12 h. Then 30 g of NaHCO₃ were added and stirring was continued for a further 5 h. Filtration gave a clear product having an SiH value of 0.08%.

1b) Hydrosilylation of product 1a with vinyltriethoxysilane and vinylcyclohexene monooxide:

A 500 mL three-neck flask was charged with 258 g of product 1a, 34 g of vinyltriethoxysilane, 11 g of vinylcyclohexene monooxide and 20 ppm of a Pt-containing catalyst and this initial charge was heated to 120° C., stirred for 12 h and distilled. Filtration gave a clear product having a solids content of 73% and an SiH value of 0%.

1c) Redissolution of product 1b in an epoxy-functionalized siloxane:

80 g of product 1b and 130 g of an α,ω-epoxy-functionalized siloxane (reaction product of M'-D₁₈-M' and vinylcyclohexene monooxide) are charged together to a 500 ml flask and distilled at 130° C. under an oil pump vacuum. At the end of distillation a clear product is obtained.

Example 2 (Inventive)

Preparation of a controlled release additive having terminal functionalities and subsequent redissolution in an epoxy-functionalized siloxane:

2a) Equilibration of an SiH-functional polysiloxane with M, M', D, and Q groups:

A 1000 mL three-neck flask was charged with 175 g of an α,ω-SiH-siloxane (M'-D₈-M', SiH value: 0.3%) and 625 g of a commercially customary M/Q silicone resin solution in xylene (solids content approximately 64%, Mw approximately 2300 g/mol). An acidic catalyst was added with stirring and the mixture was stirred for 12 h. Then 30 g of NaHCO₃ were added and stirring was continued for a further 5 h. Filtration gave a clear product having an SiH value of 0.08%.

2b) Hydrosilylation of product 2a with vinyltriethoxysilane and vinylcyclohexene monooxide:

A 500 mL three-neck flask was charged with 275 g of product 2a, 38 g of vinyltriethoxysilane, 5 g of vinylcyclohexene monooxide and 20 ppm of a Pt-containing catalyst and this initial charge was heated to 120° C., stirred for 12 h and distilled. Filtration gave a clear product having a solids content of 70% and an SiH value of 0.001%.

2c) Redissolution of product 2b in an epoxy-functionalized siloxane:

80 g of product 2b and 130 g of an α,ω-epoxy-functionalized siloxane (reaction product of M'-D₁₈-M' and vinylcyclohexene monooxide) are charged together to a 500 ml flask and distilled at 130° C. under an oil pump vacuum. At the end of distillation a clear product is obtained.

Comparative Example 3 (Not Inventive)

GE UV 9430 (from the Company GE)

Performance Testing:

Examples 1c and 2c, as abhesive coating material of the invention, were compared with the non-inventive, comparative example 3.

For this purpose, these examples were used both in the pure form and in a blend with a cationic curing silicone for low release force values. These silicones are commercially available organopolysiloxanes modified with epoxy groups capable of cationic polymerization. According to 1H NMR analysis, the product GE UV 9300 contains epoxy groups and no hydroxyl groups. In the commercially available product TEGO RC 1402 it is possible to detect hydroxyl groups as well as epoxy groups. Both products, if cured in pure form, produce a very abhesive silicone coat with comparable release properties.

The silicone formulations contain in each case 2% by weight of a diaryliodonium salt (TEGO PC 1465 from Goldschmidt). The tested mixtures of these components are summarized in Table 1.

TABLE 1

| No. | Example | Further Silicone | TEGO PC 1465 Photoinitiator |
|---|---|---|---|
| 1 | 1c | None | 2 parts |
| 2 | 2c | None | 2 parts |
| 3 | 3 | none | 2 parts |
| 4 | 1C | GE UV 9300 20 parts | 2 parts |
| 5 | 1C | TEGO RC 1402, 20 parts | 2 parts |
| 6 | 2C | GE UV 9300, 20 parts | 2 parts |
| 7 | 2C | TEGO RC 1402, 20 parts | 2 parts |
| 8 | 3 | GE UV 9300, 20 parts | 2 parts |
| 9 | 3 | TEGO RC 1402, 20 parts | 2 parts |

Mixtures 1 to 9 were then applied using a five-roll coater in a pilot plant to a BoPP film from Innovia Films, Type RN 30. The coatweight was 1.0 g/m². The coating was subsequently cured with a microwave-excited UV lamp (Fusion, 120 W/cm) at a speed of 20 m/min.

The release value of the release coatings was determined immediately and after a 24-hour storage time at room temperature in accordance with the FINAT test method No. 10. This is done using the commercial adhesive tape (25 mm wide) TESA® 7475 from Beiersdorf. To measure the adhesiveness, these adhesive tapes are applied to the release coating, using a roller, and then stored at 40° C. under a weight of 70 g/cm².

After 24 h a measurement is made of the force required to remove the respective adhesive tape from the substrate at a speed of 30 cm/min under a peel angle of 180°. This force is termed the release force or release value.

If in the course of the release there is a rapid switch between high and low release forces, this leads on average to a reduced value. This unwanted process is known to the skilled worker as zip.

Determining the adhesion of the silicone to the substrate was carried out by means of a simple subjective test which is standard within the industry. In this test, called the rub-off test, the silicone coating is rubbed reproducibly with the index finger. In this case the test was carried out by means of ten circular motions within a radius of approximately 2 cm, with moderate pressure. The test was carried out after a 24-hour storage time at room temperature. A pass is scored in the test if no silicone constituents can be rubbed off from the substrate.

The results are summarized in Table 2.

TABLE 2

| No. | Zip | Release value TESA 7475 in cN/inch immediate | Release value TESA 7475 in cN/inch after 24 h | Rub-off test passed 24 h |
|---|---|---|---|---|
| 1 | no | 790 | 800 | yes |
| 2 | no | 810 | 820 | yes |
| 3 | yes | 450 | 750 | yes |
| 4 | no | 45 | 55 | yes |
| 5 | no | 45 | 50 | yes |
| 6 | no | 42 | 56 | yes |
| 7 | no | 49 | 52 | yes |
| 8 | no | 30 | 55 | no |
| 9 | no | 29 | 51 | no |

From mixtures 1 to 3 it is apparent that a very high release value without zip is possible only with the inventive examples. Additionally, the release value of comparative example 3 is unstable, and the value measured immediately is significantly different from that after 24 hours' storage.

From mixtures 4 to 9 it is apparent that equal release values immediately and after 24 hours' storage are possible only with the inventive mixtures 4 to 7, and that this situation is improved with the mixtures 5 and 7. Additionally, the adhesion to the substrate in comparative examples 8 and 9 is inadequate.

This shows, therefore, that the inventive examples are advantageous over the non-inventive example 3, particularly if admixed abhesive coating materials contain hydroxyl groups as well as epoxy groups.

What is claimed is:

1. A cationic radiation-curing controlled release formulation for producing silicone release coatings, composed of:
    a) 1% to 60% by mass of at least one silicone resin modified with vinylalkoxysilane and vinylcyclohexene oxide,
    b) 35% to 98.5% by mass of at least one epoxy-functionalized polysiloxane, and
    c) 0.5% to 5% by mass of at least one cationic photoinitiator.

2. The cationic radiation-curing controlled release formulation as claimed in claim 1, comprising
    d) at least one coinitiator.

3. A process for preparing component a) as claimed in claim 1, by reacting, in accordance with conditions that are known per se,
    A) SiH-functional silicone resins of the general formula (I), $$M_a M'_b D_c D'_d T_e Q_f \qquad (I)$$

in which
$M = (R^1)_3 SiO_{1/2}$,
$M' = (R^1)_2 HSiO_{1/2}$,
$D = (R^1)_2 SiO_{2/2}$,
$D' = (R^1) HSiO_{2/2}$,
$T = (R^1) SiO_{3/2}$, $Q=SiO_{4/2}$, $R^1$ are identical or different radicals from the following group: alkyl, aryl, or alkaryl having 1 to 30 C atoms, a=4 to 200,
b=0 to 20,
c=0 to 100,
d=0 to 20,
e=0 to 150, and
f=1 to 200, with the proviso that the sum of b+d is $\geq 1$, with B) vinylalkoxysilanes of the general formula (II),

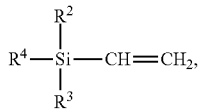

formula II in which $R^2$, $R^3$, and $R^4$ are identical or different alkyl, alkoxy, aryl, aryloxy or alkenyl radicals having 1 to 20 carbon atoms, with the proviso that at least one radical is an alkoxy group, and C) vinylcyclohexene oxide, with the proviso that the molar ratio n(vinylalkoxysilane)/n(vinylcyclohexene oxide) is >1.

4. The process as claimed in claim 3, wherein $R^2=R^3=R^4=OCH_3$.

5. The process as claimed in claim 3, wherein $R^2=R^3=R^4=OC_2H_5$.

* * * * *